United States Patent
Barainca et al.

(10) Patent No.: US 10,590,783 B2
(45) Date of Patent: Mar. 17, 2020

(54) STATOR ASSEMBLY WITH RETENTION CLIP FOR GAS TURBINE ENGINE

(71) Applicant: United Technologies Corporation, Farmington, CT (US)

(72) Inventors: Brian Barainca, Kennebunk, ME (US); Dennis R. Tremblay, Biddeford, ME (US); Steven J. Feigleson, Waverly Hall, GA (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 228 days.

(21) Appl. No.: 15/606,191

(22) Filed: May 26, 2017

(65) Prior Publication Data

US 2018/0340432 A1 Nov. 29, 2018

(51) Int. Cl.
*F01D 9/04* (2006.01)
*F01D 25/24* (2006.01)

(52) U.S. Cl.
CPC ........... *F01D 9/042* (2013.01); *F01D 25/246* (2013.01); *F05D 2230/64* (2013.01); *F05D 2240/12* (2013.01)

(58) Field of Classification Search
CPC ........ F01D 9/042; F01D 25/246; F01D 5/303; F01D 5/3053; F01D 11/12; F05D 2230/64; F05D 2240/12; Y10T 403/7075; F16B 21/12
USPC .................................. 411/530, 351, 513, 514
See application file for complete search history.

(56) References Cited

U.S. PATENT DOCUMENTS

| | | | |
|---|---|---|---|
| 5,399,069 A * | 3/1995 | Marey | F01D 9/042 415/189 |
| 6,409,472 B1 | 6/2002 | McMahon et al. | |
| 6,655,912 B2 | 12/2003 | Bos | |
| 2012/0189438 A1 * | 7/2012 | Feigleson | F01D 9/042 415/189 |
| 2014/0356158 A1 | 12/2014 | Barnett | |
| 2016/0053622 A1 | 2/2016 | Farah et al. | |

FOREIGN PATENT DOCUMENTS

EP 1213483 6/2002

OTHER PUBLICATIONS

European Search Report for European Patent Application No. 18173421 completed Sep. 17, 2018.

* cited by examiner

*Primary Examiner* — Kenneth J Hansen
(74) *Attorney, Agent, or Firm* — Carlson, Gaskey & Olds, P.C.

(57) ABSTRACT

A stator assembly of a gas turbine engine according to an example of the present disclosure includes, among other things, a first shroud extending about an assembly axis to bound a flow path. The first shroud defines a first shroud opening. An airfoil has an airfoil body extending from a first end portion. The first end portion is received in the first shroud opening and defines a pair of airfoil openings. A retention clip has an intermediate portion connecting a first leg portion and a second leg portion. The intermediate portion is compressible to position the first and second leg portions in the pair of airfoil openings such that the retention clip limits movement of the airfoil relative to the first shroud.

17 Claims, 7 Drawing Sheets

STATOR ASSEMBLY WITH RETENTION CLIP FOR GAS TURBINE ENGINE

BACKGROUND

This application relates to retention of components for a gas turbine engine, such as retention of a stator assembly.

Gas turbine engines are known, and typically include a fan delivering air into a low pressure compressor section. The air is compressed in the low pressure compressor section, and passed into a high pressure compressor section. From the high pressure compressor section the air is introduced into a combustion section where it is mixed with fuel and ignited. Products of this combustion pass downstream over a high pressure turbine section, and then a low pressure turbine section to extract energy for driving the fan.

Gas turbine engines typically include a stator assembly including airfoils to guide flow through a flow path. The airfoils are secured to portions of the stator assembly.

SUMMARY

A stator assembly of a gas turbine engine according to an example of the present disclosure includes a first shroud extending about an assembly axis to bound a flow path. The first shroud defines a first shroud opening. An airfoil has an airfoil body extending from a first end portion. The first end portion is received in the first shroud opening and defines a pair of airfoil openings. A retention clip has an intermediate portion connecting a first leg portion and a second leg portion. The intermediate portion is compressible to position the first and second leg portions in the pair of airfoil openings such that the retention clip limits movement of the airfoil relative to the first shroud.

In a further embodiment of any of the foregoing embodiments, the intermediate portion causes each of the first leg portion and the second leg portion to press against walls of a respective one of the pair of airfoil openings when the retention clip is in an installed position.

In a further embodiment of any of the foregoing embodiments, the retention clip includes a pair of generally U-shaped handles that each connect the intermediate portion to a respective one of the first and second leg portions.

In a further embodiment of any of the foregoing embodiments, the first leg portion defines a first leg axis extending through a first terminal end, and the second leg portion defines a second leg axis extending through a second terminal end. The first leg axis is transverse to the second leg axis when the retention clip is in an installed position.

In a further embodiment of any of the foregoing embodiments, each of the first leg axis and the second leg axis is substantially parallel to the assembly axis when the retention clip is located in the installed position.

In a further embodiment of any of the foregoing embodiments, each of the first terminal end and the second terminal end is received through a respective one of the pair of airfoil openings, and at least one of the first leg portion and the second leg portion has a tapered geometry that extends along a length of a respective one of the first leg axis and the second leg axis.

In a further embodiment of any of the foregoing embodiments, the retention clip includes a pair of handles that each connect the intermediate portion to a respective one of the first and second leg portions.

In a further embodiment of any of the foregoing embodiments, the intermediate portion has an arcuate geometry, and each of the pair of handles has a generally U-shaped geometry and extends outward relative to a reference plane defined through the first leg axis and the second leg axis.

In a further embodiment of any of the foregoing embodiments, the second leg portion defines a shoulder that abuts against the first end portion of the airfoil when the retention clip is located in an installed position.

In a further embodiment of any of the foregoing embodiments, each of the first leg portion, the second leg portion and the intermediate portion have an elliptical cross section.

In a further embodiment of any of the foregoing embodiments, the stator assembly is situated in a bypass duct.

A gas turbine engine according to an example of the present disclosure includes a fan section that has a plurality of fan blades rotatable about an engine axis, a compressor section in fluid communication with the fan section, a turbine section driving the fan section, and a stator assembly including a first shroud and a second shroud each extending about the engine axis. The first shroud defines an array of first openings, and the second shroud defines an array of second openings. A plurality of airfoils each have an airfoil body extending between first and second end portions. The first end portion is situated in a respective one of the array of first openings, and the second end portion is situated in a respective one of the array of second openings. A plurality of retention clips each has an intermediate portion connecting a first leg portion and a second leg portion. The intermediate portion is compressible to position the first and second leg portions through the first end portion of a respective one of the plurality of airfoils to limit movement of the first end portion relative to the first shroud.

In a further embodiment of any of the foregoing embodiments, the first end portion defines a pair of airfoil openings, and the intermediate portion causes each of the first leg portion and the second leg portion to press against walls of the pair of airfoil openings when a respective one of the plurality of retention clips is located in an installed position.

In a further embodiment of any of the foregoing embodiments, the stator assembly is situated in bypass flow path aft of the fan section.

In a further embodiment of any of the foregoing embodiments, the stator assembly is an inlet guide vane assembly forward of the compressor section.

A further embodiment of any of the foregoing embodiments includes a first retention member formed adjacent to each first end portion to trap the plurality of retention clips.

In a further embodiment of any of the foregoing embodiments, each second end portion receives a respective one of the plurality of retention clips to limit movement of the plurality of airfoils.

A method of assembling a stator assembly for a gas turbine engine according to an example of the present disclosure includes providing a shroud defining a shroud opening, moving an end portion of an airfoil into the shroud opening, the end portion defining a pair of airfoil openings, compressing a retention clip that includes a pair of leg portions, and moving the pair of leg portions through the pair of airfoil openings such that the retention clip limits movement of the airfoil relative to the shroud.

In a further embodiment of any of the foregoing embodiments, the step of moving the pair of leg portions includes simultaneously sliding the pair of leg portions a distance through the pair of airfoil openings.

In a further embodiment of any of the foregoing embodiments, the shroud defines a portion of a bypass flow path downstream of a fan.

The details of one or more embodiments are set forth in the accompanying drawings and the description below.

Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
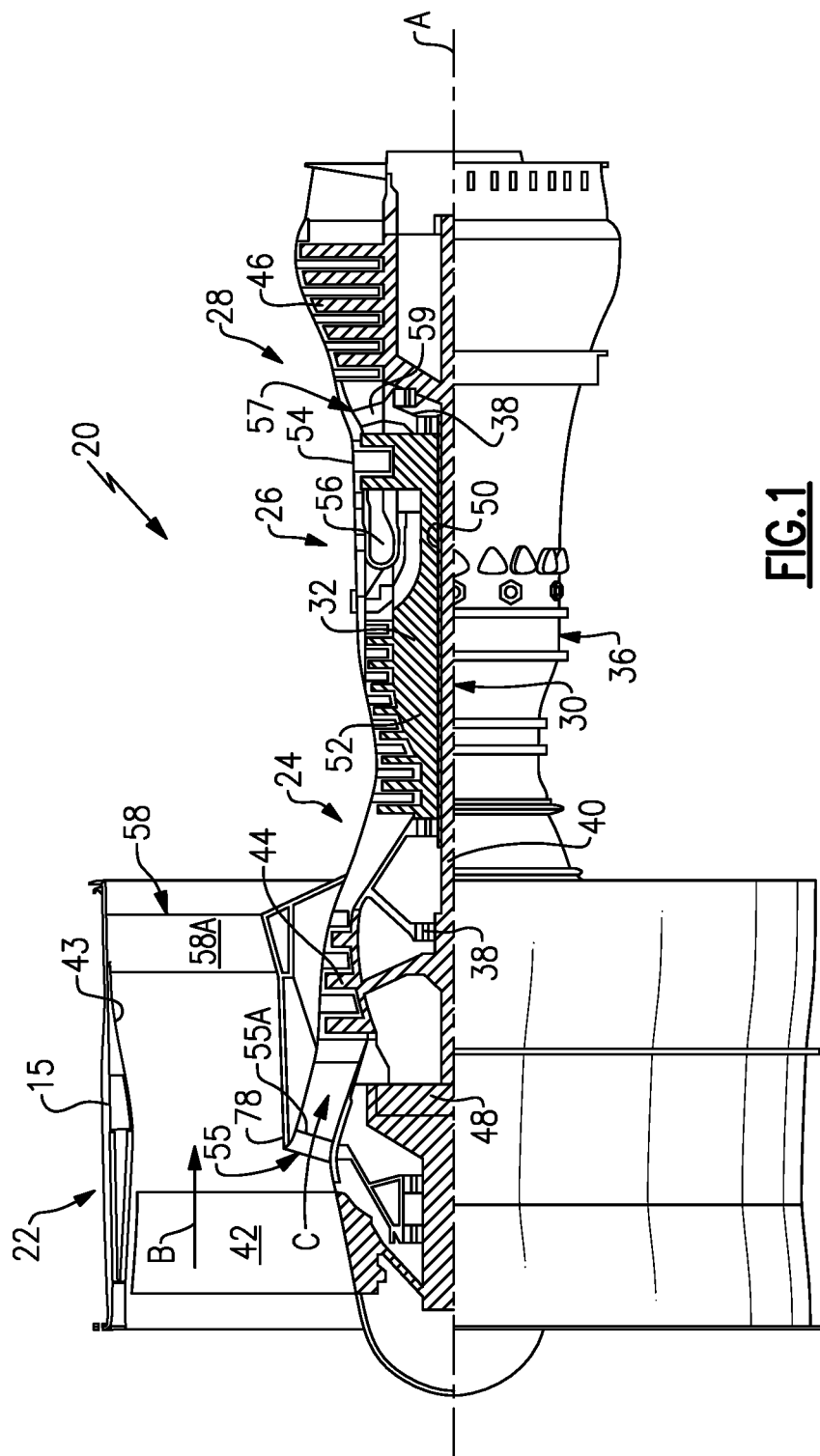
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

The engine 20 can include a structural guide vane (SGV) or bypass guide vane system 58 situated aft of the fan 42 in a bypass duct 43 defining the bypass flow path B. The bypass guide vane system 58 can include a plurality of airfoils 58A (one shown in FIG. 1) extending radially between an inner diameter and outer diameter of the bypass duct 43.

The engine 20 can include a fan exit stator (FES) or inlet guide vane assembly 55 downstream of the fan 42 and radially inward of a splitter 78. The inlet guide vane assembly 55 directs flow along the core flow path C from the fan 42 into the compressor section 24. The inlet guide vane assembly 55 can include a plurality of airfoils 55A (one shown in FIG. 1) arranged circumferentially about the engine central longitudinal axis A.

FIGS. 2-5 illustrate an example stator assembly 60 for guiding airflow through a flow path. In some examples, the stator assembly 60 is a portion of the inlet guide vane assembly 55 and/or the bypass guide vane system 58. The stator assembly 60 can also be utilized in the compressor section 24, turbine section 28 or mid-turbine frame 57. Other portions and components of the engine 20 can also benefit from the teachings herein, such as retention of combustor panels in the combustor section 26 or blade outer air seals (BOAS) in the turbine section 28.

Figure 2:
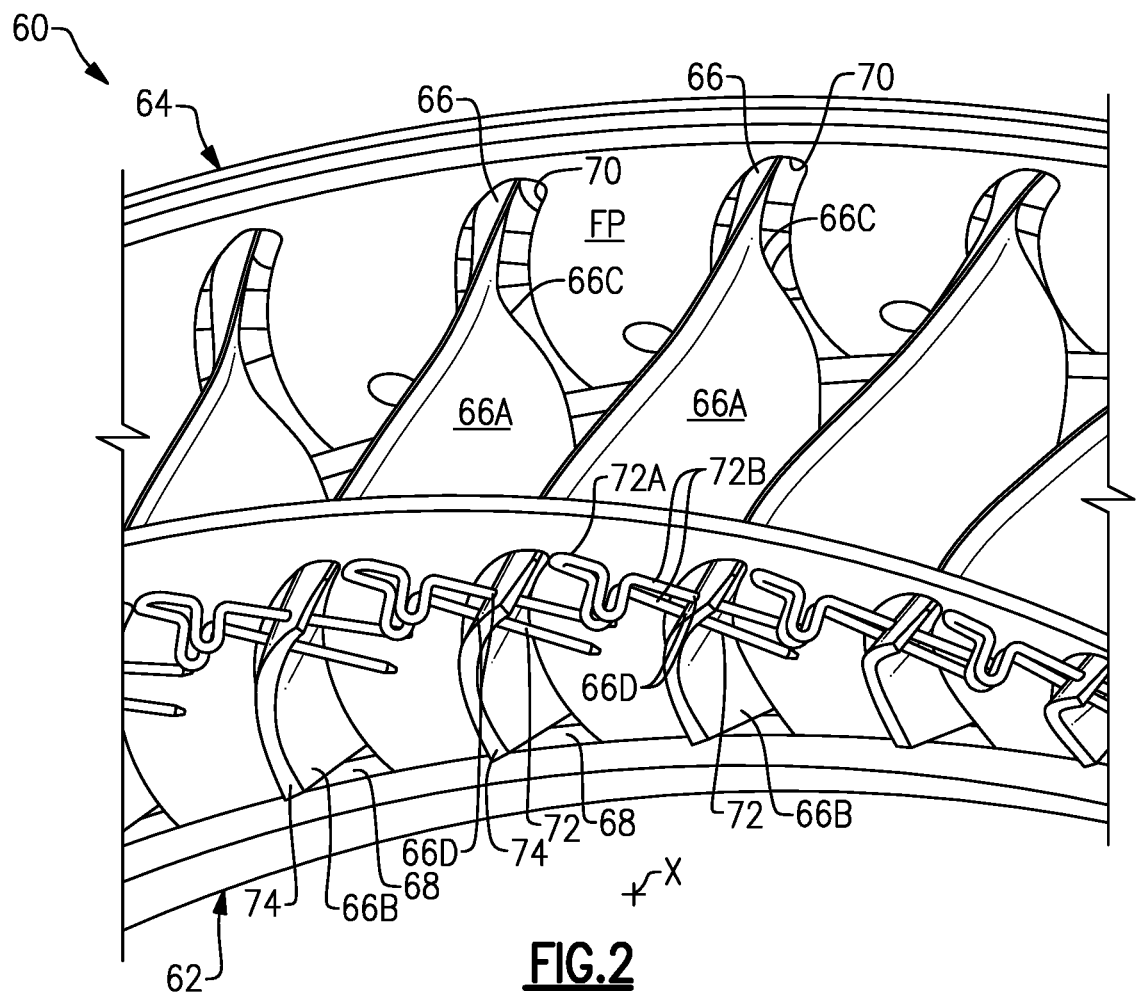
FIG. 2 illustrates a perspective view of an example stator assembly.
Figure 3:
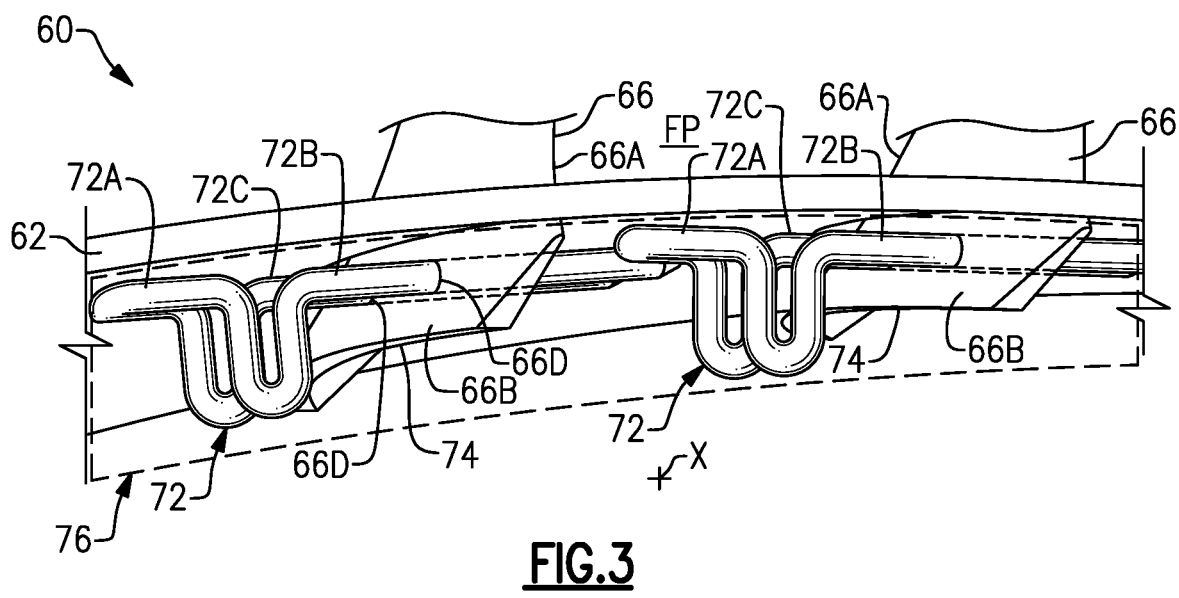
FIG. 3 illustrates a perspective view of an inner diameter portion of the stator assembly of FIG. 2.
Figure 4:
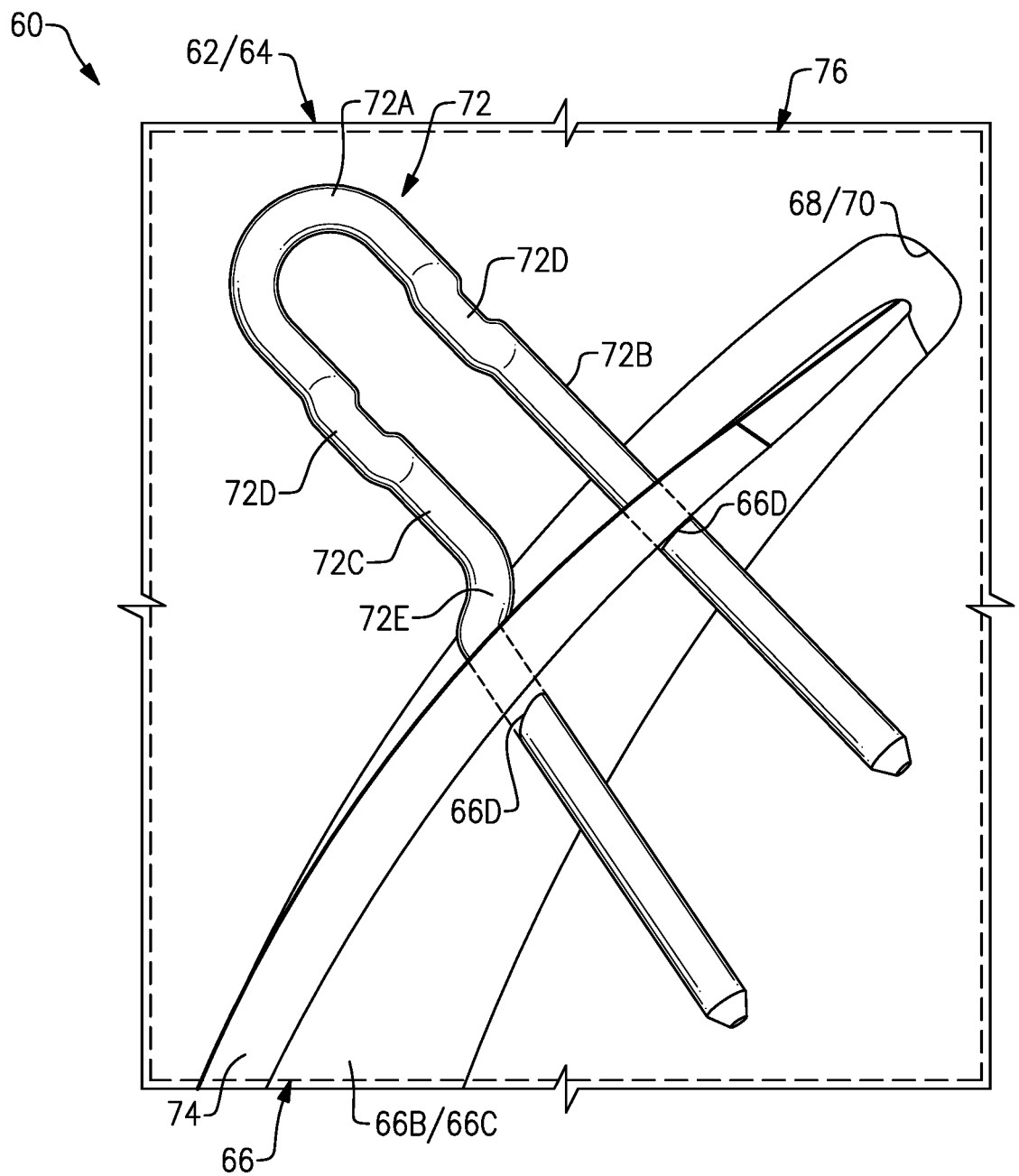
FIG. 4 illustrates a perspective view of the stator assembly of FIG. 2.

The stator assembly 60 includes an inner (or first) shroud 62 and an outer (or second) shroud 64 each extending about an assembly axis X to bound a flow path FP (FIGS. 2-3). The flow path FP may correspond to a portion of the bypass flow path B and/or the core flow path C, and the assembly axis X may correspond to the engine central longitudinal axis A in FIG. 1, for example. The stator assembly 60 includes an array of airfoils 66 that are arranged circumferentially about the assembly axis X to guide or direct flow through the flow path FP. Each of the airfoils 66 includes an airfoil body 66A that extends between a first end portion 66B (FIGS. 2-4) and a second end portion 66C (FIGS. 2 and 4).

Figure 5:
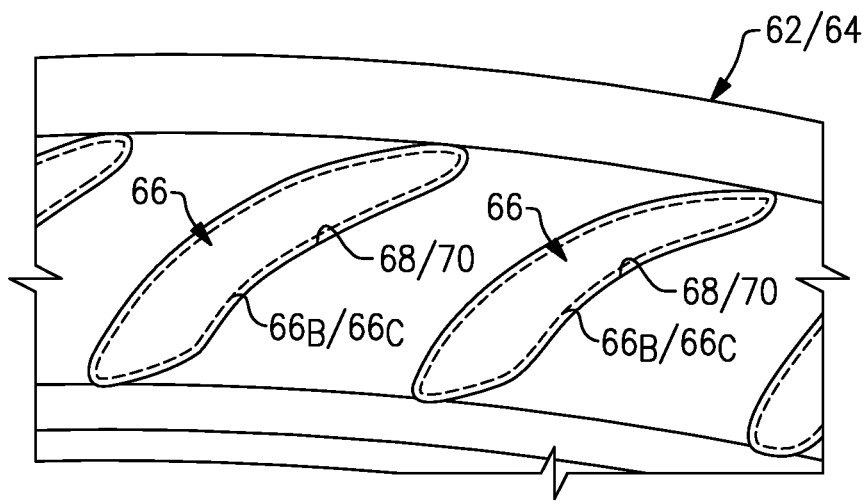
FIG. 5 illustrates a portion of a shroud of the stator assembly of FIG. 2.

The inner shroud 62 defines an array of inner (or first) shroud openings 68. The outer shroud 64 defines an array of outer (or second) shroud openings 70. As illustrated by FIG. 5, the shroud openings 68, 70 can be generally contoured relative to a perimeter of respective first and second end portions 66B, 66C of the airfoils 66 (shown in dashed lines).

The shroud openings 68, 70 receive respective first and second end portions 66B, 66C of the airfoils 66. For example, the inner shroud 62 can be positioned relative to the assembly axis X, with each of the airfoils 66 moved in a radially inward direction to be received in one of the first shroud openings 68. Thereafter, the outer shroud 64 can be moved radially inward to position the second end portion 66C of the airfoils 66 in the second shroud openings 70.

Figure 6:
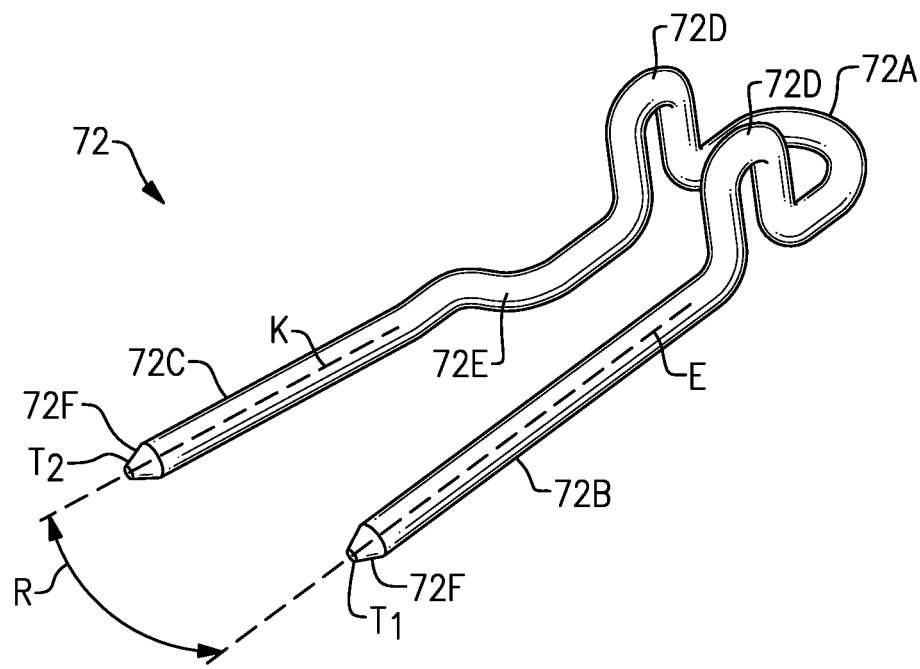
FIG. 6 illustrates a retention clip.

Referring to FIG. 6 with continued reference to FIGS. 2-5, the stator assembly 60 includes a plurality of retention clips 72 for selectively securing the airfoils 66 to the inner shroud 62 and/or the outer shroud 64. In the illustrated example of FIG. 3, the first end portion 66B of each airfoil 66 is mechanically coupled to the inner shroud 62 using one or more retention clips 72. The second end portion 66C can be mechanically coupled to the outer shroud 64 by one or more fasteners. In another example, the first end portion 66B of each airfoil 66 is mechanically coupled to the inner shroud 62 by one or more fasteners, and second end portion 66C can be mechanically coupled to the outer shroud 64 by one or more retention clips 72 (see FIG. 4). In one example, the first end portion 66B and the second end portion 66C of at least some of the airfoils 66 are mechanically coupled to the inner and outer shrouds 62, 64 by one or more retention clips 72.

Each retention clip 72 includes an intermediate portion 72A that can have a generally C-shaped or arcuate geometry. The intermediate portion 72A connects a pair of elongated leg portions, including a first elongated leg portion 72B and a second elongated leg portion 72C. The retention clip 72 can be formed from an extrusion process and made of a tempered metal or metal alloy, for example, to provide a spring function for self-retention as discussed in more detail below. The retention clip 72 can have a substantially uniform cross-section between terminal ends T1, T2, including along the leg portions 72B, 72C and the intermediate portion 72A. These techniques can reduce the cost of fabricating the retention clips 72. Other example techniques for fabricating the retention clips 72 can include a casting or machining process. In some examples, the retention clip 72 is formed of a non-metallic material such as a plastic or composite.

The first leg portion 72B defines a first leg axis E extending through terminal end T1, and the second leg portion 72C defines a second leg axis K extending through terminal end T2. The retention clip 72 can be arranged such that the first leg axis E is transverse to the and the second leg axis K to define an angle R when the retention clip 72 is compressed and/or decompressed, such as when the retention clip 72 is in an installed position. In some examples, axis E and axis K are substantially parallel when the retention clip 72 is compressed or decompressed. Axis E and/or axis K can be substantially parallel to the assembly axis X when the retention clip 72 is located in an installed position. As discussed in more detail below, the intermediate portion 72A is compressible to position the first and second leg portions 72B, 72C through the end portion 66B/66C of a respective one of the airfoils 66 to limit movement of the end portion 66B/66C relative to the respective shroud 62/64.

The leg portions 72B, 72C can have a generally elliptical cross-section, such a substantially round cross-section. In another example, the leg portions 72B, 72C have a generally rectangular cross-section. In the illustrated example of FIG. 5, the first leg portion 72B extends a first distance from the intermediate portion 72A, and the second leg portion 72C extends a second distance from the intermediate portion 72A that is greater than the first distance. In other examples, the leg portions 72B, 72C can extend substantially the same length.

The retention clip 72 can include a pair of protrusions or handles 72D that each connect the intermediate portion 72A to a respective one of the leg portions 72B, 72C. The handles 72D can have a generally U-shaped geometry and can extend outward relative to a reference plane defined through the first leg axis E and the second leg axis K. In the illustrated example, the handles 72D are substantially perpendicular or otherwise transverse to the reference plane.

The handles 72D can be utilized by an operator to assist in installing and/or uninstalling the retention clip 72. For example, the handles 72D can be utilized to compress and/or decompress the intermediate portion 72A of the retention clip 72 such that the leg portions 72B, 72C are moved inward or outward relative to each other. The intermediate portion 72A can be configured to move the leg portions 72B, 72C away from each other when the intermediate portion 72A is decompressed.

Figure 7:
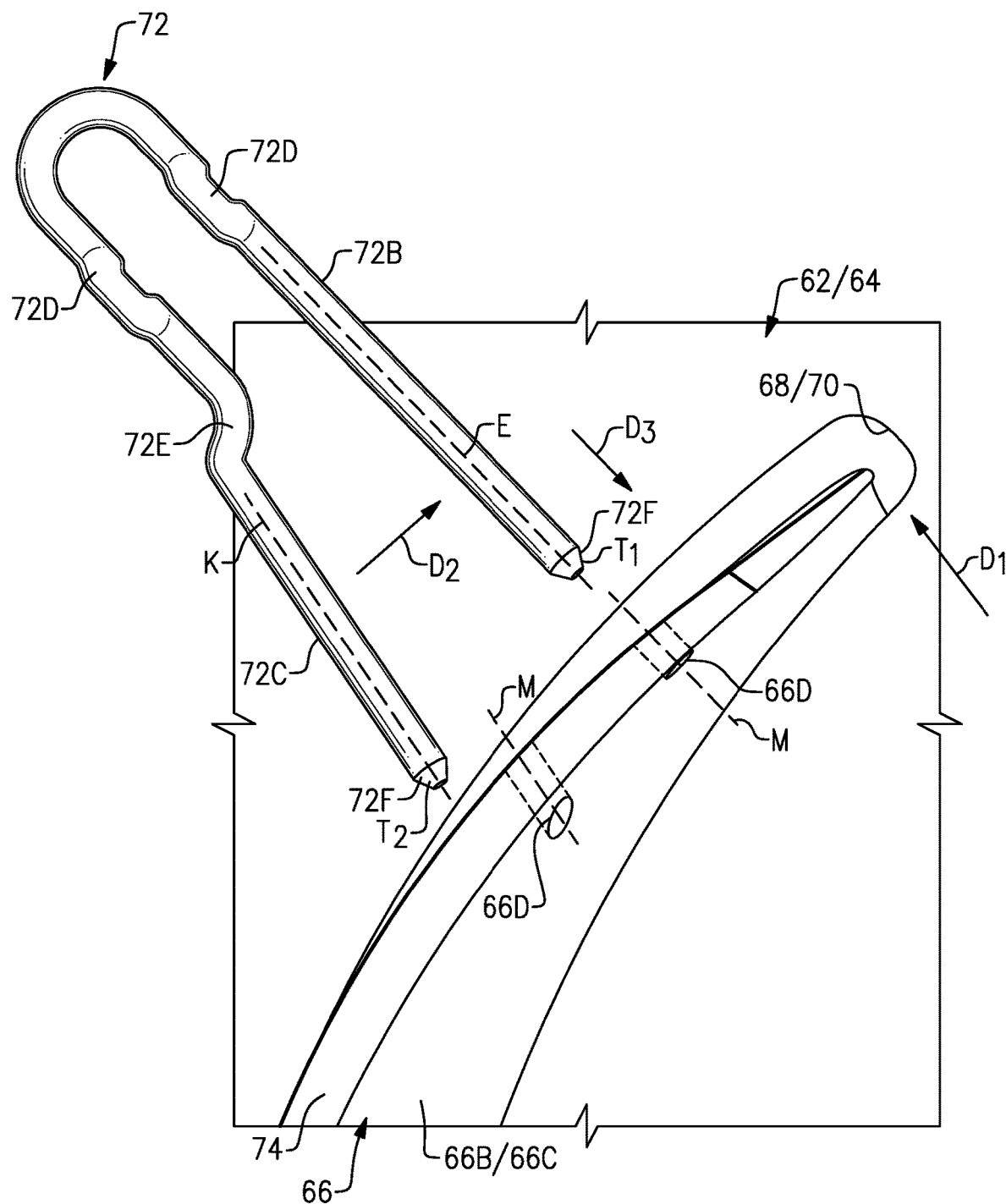
FIG. 7 illustrates an exploded view of a portion of the stator assembly of FIG. 2.

The first and/or second end portions 66B, 66C of the airfoils 66 define a plurality of airfoil openings 66D spaced from a ridge 74 of the respective end portion 66B, 66C, with each airfoil opening 66D defining a passage axis M (FIG. 7). The leg portions 72B, 72C are received in a respective pair of airfoil openings 66D such that the retention clip 72 limits or bounds movement of the respective airfoil 66 relative to at least one of the shrouds 62, 64. The airfoil openings 66D, respective passages and the end portions 66B, 66C can have a generally complementary profile with respect to a cross-section of the leg portions 72B, 72C.

The intermediate portion 72A can be dimensioned to substantially span a distance between the pair of airfoil openings 66D when the retention clip 72 is located in the installed position. In the illustrated example, a width of the intermediate portion 72A is less than a distance between the pair of airfoil openings 66D. The intermediate portion 72A is compressible to position the leg portions 72B, 72C in the airfoil openings 66D such that the retention clip 72 limits movement of the airfoil 66 relative to the respective shroud 62, 64.

The airfoil openings 66D can be defined at a position relative to the first and/or second end portions 66B, 66C of the airfoils 66 such that the retention clips 72 are spaced a distance from the respective shrouds 62, 64 to accommodate tolerance stack ups of the stator assembly 60 and reduce a likelihood of corrosion in examples in which the different materials of the components are utilized. Each of the leg portions 72B, 72C can have a tapered portion 72F to assist in guiding the leg portions 72B, 72C through the airfoil openings 66D.

The second leg portion 72C can be contoured to define a shoulder 72E. The second leg portion 72C is dimensioned such that the shoulder 72E abuts against or otherwise engages one of the end portions 66B, 66C of the airfoil 66 when the retention clip 72 is located in an installed position. In some examples, the first leg portion 72C or both of the leg portions 72B, 72C define a respective shoulder such that the leg portions 72B, 72C extend through the airfoil openings 66D at a desired distance. In the illustrated example, the shoulder 72E is defined such that opposite ends of the retention clip 72 are positioned approximately equidistant from an adjacent ridge 74 of the airfoil 66 to reduce a likelihood of rocking of the retention clip 72 about the ridge 74. In other examples, the shoulder 72E is omitted and the handles 72D are dimensioned to against or otherwise engages one of the end portions 66B, 66C of the airfoil 66 when the retention clip 72 is located in an installed position.

The stator assembly 60 can include one or more secondary retention members 76 (shown in dashed lines in FIGS. 3 and 4) formed adjacent to the end portions 66B, 66C to secure the airfoils 66 to the shrouds 62, 64. Each secondary retention member 76 can include one or more portions arranged about the assembly axis X to define a ring. Each secondary retention member 76 may comprise an elastic material, such as a polymer or other rubber based substance, which may at least partially absorb impacts or dampen vibrations in the surrounding portions of the stator assembly 60. In one example, the secondary retention member 76 is made from a vulcanized silicon rubber.

Material of the secondary retention member 76 can be deposited at suitable locations relative to the stator assembly 60. In the illustrated example, the secondary retention member 76 can be formed in the spaces between the respective shrouds 62, 64, the end portions 66B, 66C and the retention clips 72. The secondary retention member 76 traps or otherwise opposes withdrawal of the retention clips 72 from the airfoil openings 66D, which further reduces the likelihood of the retention clips 72 becoming dislodged from the end portions 66B, 66C and liberation of one or more of the airfoils 66.

Referring to FIG. 7, the retention clip 72 can be installed as follows. The airfoil 66 is moved in a direction D1 (e.g., generally perpendicular to the assembly axis X) such that the end portion 66B/66C is received through the respective shroud opening 68/70. The intermediate portion 72A of the retention clip 72 is compressed by squeezing handles 72D together such that the second leg portion 72C is moved in a direction D2 toward the first leg portion 72B (or vice versa). The retention member 72 is compressed until the first leg axis E and the second leg axis K are substantially aligned with a respective passage axis M of the airfoil openings 66D.

The leg portions 72B, 72C of the retention clip 72 are moved in a direction D3 until the terminal ends T1, T2 of the leg portions 72B, 72C are received through the airfoil openings 66D. Thereafter, the leg portions 72B, 72C are simultaneously slid, or otherwise continue to move, a distance in the direction D3 through the airfoil openings 66D until the shoulder 72E (or at least one of the handles 72D if the shoulder 72E is omitted) abuts against the end portion 66B/66C of the airfoil 66, as illustrated by FIG. 4. The handles 72D can be released once the secondary retention member 76 is situated relative to the end portion 66B/66C of the airfoil 66. The secondary retention member 76 (FIG. 4) can be formed around portions of the retention clip 72 and the end portion 66B/66C of the airfoil 66 to also secure the retention clip 72.

When in the installed position, the retention clip 72 securely engages the end portion 66B/66C of the airfoil 66. In the illustrated example of FIG. 4, the intermediate portion 72A provides a self-retention feature that causes each of the leg portions 72B, 72C to press outwardly against walls of the respective airfoil openings 66D when the retention clip 72 is in the installed position. Forces generated by the intermediate portion 72A cause the leg portions 72B, 72C to resist relative movement and withdraw of the leg portions 72B, 72C from the end portion 66B/66C of the airfoil 66. In other examples, the intermediate portion 72A and leg portions 72B, 72C are dimensioned relative to the airfoil openings 66D such that the leg portions 72B, 72C are moved outwardly relative to each other to be slideably received in the airfoil openings 66D, with the leg portions 72B, 72C pressing inwardly against walls of the respective airfoil openings 66D to provide a clamping action when in the installed position and the retention clip 72 is permitted to decompress.

To disassemble the stator assembly 60, at least a portion of the secondary retention member 76 can be removed and then the retention clip 72 can be moved in a direction opposite to direction D3 to withdraw leg portions 72B, 72C of the retention clip 72 from the airfoil openings 66D. Thereafter, the airfoil 66 can be moved in a direction opposite to direction D1 to remove the airfoil 66 from the shroud opening 68/70.

Figure 8:
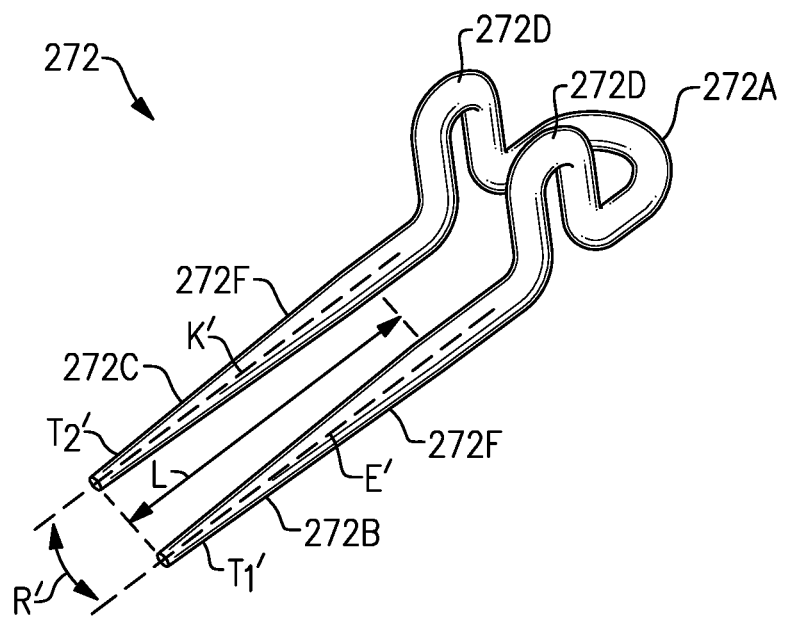
FIG. 8 illustrates a retention clip according to a second example.

FIG. 8 illustrates a retention clip 272 according to a second example. First elongated leg portion 272B and second elongated leg portion 272C can each include a tapered portion 272F that extends a length L from respective terminal ends T1', T2'. The tapered portion 272F can be defined such that such that the leg portions 272B, 272C extend through airfoil openings 66D (see FIGS. 3 and 4) at a desired distance. In the illustrated example, the length L is defined such that a diameter of the leg portions 272B, 272C is less than a diameter of respective airfoil openings 66D (see FIGS. 3 and 4) at terminal ends T1', T2', but is greater than the respective airfoil openings 66D along the length L of the respective tapered portion 272F to bind against or otherwise engage walls of the airfoil openings 66D when the retention clip 272 is located in an installed position (see FIGS. 3 and 4). The length L corresponding to the tapered portion 272F of each of the leg portions 272B, 272C can be the same or different.

The leg portion 272B defines a first leg axis E' extending through terminal end T1', and the leg portion 272C defines a second leg axis K' extending through terminal end T2'. The first and second leg axis E', K' define angle R' relative to each other. Axis E', axis K' and/or angle R' can be defined in any manner discussed with respect to axis E, axis K and angle R of retention clip 72, for example.

Figure 9A:
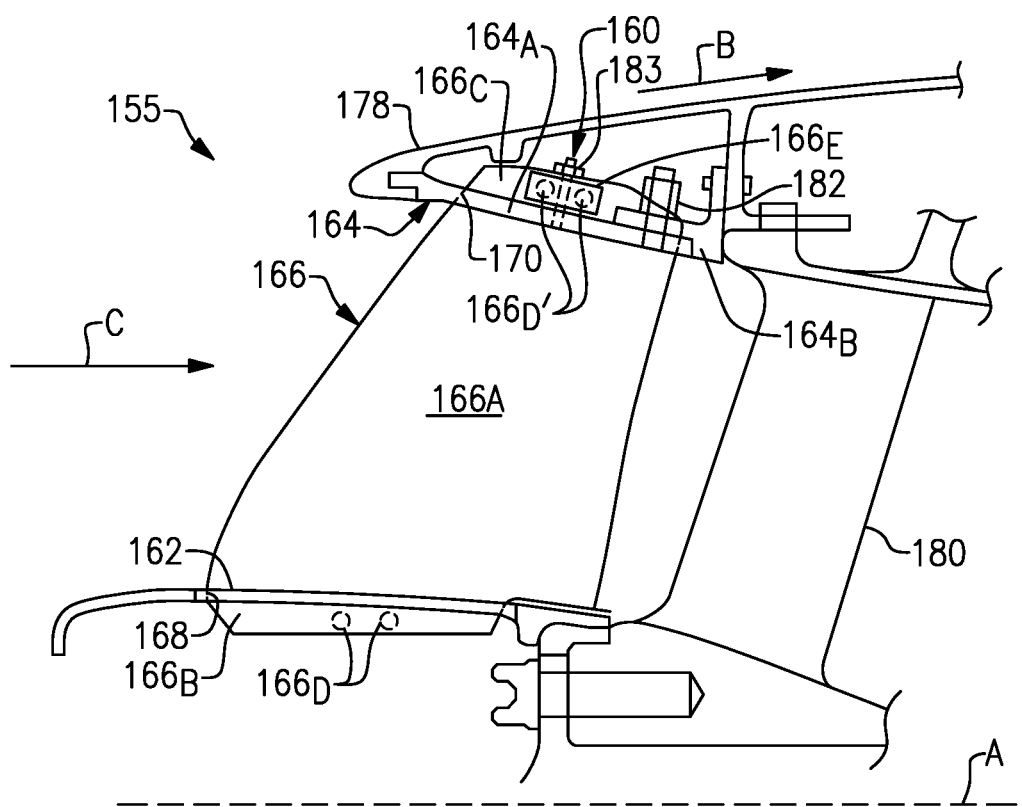
FIG. 9A illustrates an example inlet guide vane assembly.
Figure 9B:
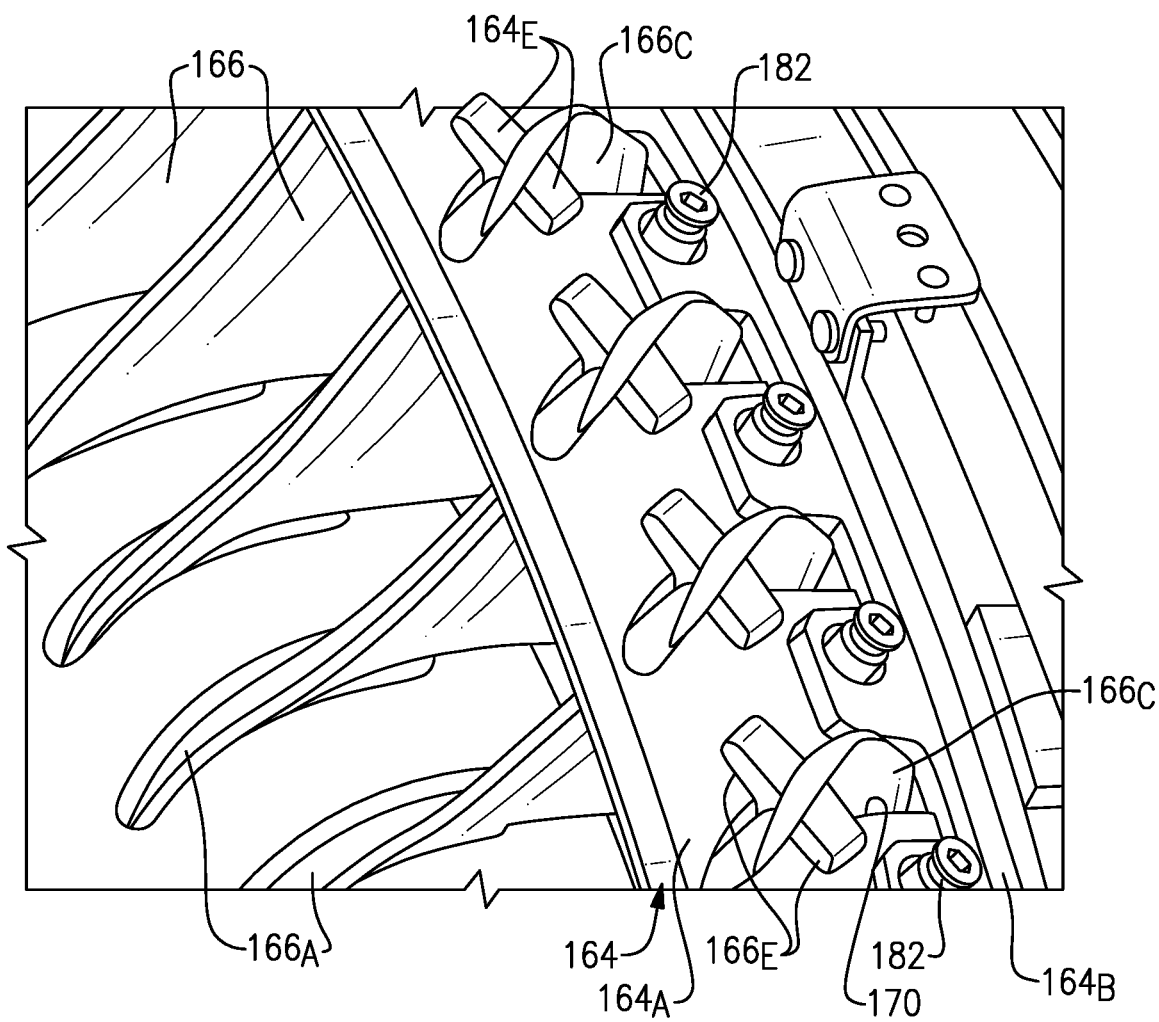
FIG. 9B illustrates a shroud for the inlet guide vane assembly of FIG. 9A.

FIGS. 9A and 9B illustrate an example inlet guide vane assembly 155. The inlet guide vane assembly 155 can be utilized in the engine 20, for example. In the illustrated example, a stator assembly 160 is situated at a splitter 178. The splitter 178 directs airflow to the bypass and core flow paths B, C. The stator assembly 160 can be situated forward of one or more vanes 180 that can be situated upstream of a compressor section, such as the low pressure compressor 44 of engine 20.

The stator assembly 160 includes inner and outer (or first and second) shrouds 162, 164 defining shroud openings 168, 170. One of the end portions 166B, 166C of airfoils 166 (one shown) defines one or more airfoil openings 166D. In the illustrated example of FIG. 8, an inner (or first) end portion 166B of the airfoil 166 defines the airfoil openings 166D. The airfoil openings 166D can be configured to receive a respective retention clip, such as one of the retention clips 72, 272.

The outer shroud 164 can include a forward (or first) portion 164A and an aft (or second) portion 164B mechanically attached or otherwise secured to each other with one or more fasteners 182 (one shown). The forward and aft portions 164A, 164B can each have a generally annular geometry extending about the engine central longitudinal axis A, as illustrated by FIG. 9B. In some examples, the inner shroud 162 can include forward and aft portions similar to the outer shroud 164. In alternative examples, the outer shroud 164 includes a single annular portion (see, e.g., shroud 64 of FIG. 5).

The inner or outer end portions 166B, 166C of airfoils 166 can include an attachment portion such as a set of outwardly extending tabs 166E. One or more secondary retention members (see, e.g., 76 at FIGS. 3 and 4) can be formed adjacent to the tabs 166E. In another example, the tabs 166E are mechanically attached or other secured to the respective inner or outer shrouds 162, 164 with one or more fasteners 183 (one shown in dashed lines in FIG. 9A), such as rivets or bolts and nuts. In some examples, airfoil openings 166D' (shown in dashed lines) can be defined in the outer end portion 166C to receive retention clips, and the tabs 166E can be omitted. The inner end portion 166B and the outer end portion 166C of at least some of airfoils 166 can be secured to the shrouds 162, 164 with one or more retention clips, including any of the retention clips disclosed herein, with one or more secondary retention members (see, e.g., 76 at FIGS. 3 and 4) formed adjacent to each of the end portions 166B, 166C to secure the retention clips.

The retention clips 72, 272 disclosed herein can secure airfoils or other components of the engine 20 within relatively small clearances and spaces. The retention clip 72, 272 can also be made in a simplified manner to reduce system complexity.

One or more embodiments have been described. Nevertheless, it will be understood that various modifications may be made. For example, when reengineering from a baseline engine configuration, details of the baseline may influence details of any particular implementation. Accordingly, other embodiments are within the scope of the following claims.

What is claimed is:

1. A stator assembly of a gas turbine engine comprising:
a first shroud extending about an assembly axis to bound a flow path, the first shroud defining a first shroud opening;
an airfoil including an airfoil body extending from a first end portion, the first end portion received in the first shroud opening and defining a pair of airfoil openings; and
a retention clip including an intermediate portion connecting a first leg portion and a second leg portion, the intermediate portion being compressible to position the first and second leg portions in the pair of airfoil openings such that the retention clip limits movement of the airfoil relative to the first shroud, and wherein the second leg portion moves in a direction toward the first leg portion in response to compression of the intermediate portion;
wherein the intermediate portion causes each of the first leg portion and the second leg portion to press against walls of a respective one of the pair of airfoil openings when the retention clip is in an installed position; and
wherein the retention clip includes a pair of generally U-shaped handles that each connect the intermediate portion to a respective one of the first and second leg portions.

2. The stator assembly as recited in claim 1, wherein the first leg portion defines a first leg axis extending through a first terminal end, and the second leg portion defines a second leg axis extending through a second terminal end, the first leg axis being transverse to the second leg axis when the retention clip is in the installed position.

3. The stator assembly as recited in claim 2, wherein each of the first leg axis and the second leg axis is substantially parallel to the assembly axis when the retention clip is located in the installed position.

4. The stator assembly as recited in claim 2, wherein each of the first terminal end and the second terminal end is received through the respective one of the pair of airfoil openings, and at least one of the first leg portion and the second leg portion has a tapered geometry that extends along a length of a respective one of the first leg axis and the second leg axis.

5. The stator assembly as recited in claim 2, wherein the intermediate portion has an arcuate geometry, and each of the pair of handles extends outward relative to a reference plane defined through the first leg axis and the second leg axis.

6. The stator assembly as recited in claim 1, wherein the second leg portion defines a shoulder that abuts against the first end portion of the airfoil when the retention clip is located in the installed position.

7. The stator assembly as recited in claim 1, wherein each of the first leg portion, the second leg portion and the intermediate portion have an elliptical cross section.

8. The stator assembly as recited in claim 1, wherein the stator assembly is situated in a bypass duct.

9. A gas turbine engine comprising:
a fan section including a plurality of fan blades rotatable about an engine axis;
a compressor section in fluid communication with the fan section;
a turbine section driving the fan section; and
a stator assembly comprising:
a first shroud and a second shroud each extending about the engine axis, the first shroud defining an array of first openings, and the second shroud defining an array of second openings;
a plurality of airfoils each including an airfoil body extending between first and second end portions, the first end portion situated in a respective one of the array of first openings, and the second end portion situated in a respective one of the array of second openings; and a plurality of retention clips each including an intermediate portion connecting a first leg portion and a second leg portion, the intermediate portion being compressible to position the first and second leg portions through the first end portion of a respective one of the plurality of airfoils to limit movement of the first end portion relative to the first shroud, and wherein the second leg portion moves in a direction toward the first leg portion in response to compression of the intermediate portion;

wherein the first end portion defines a pair of airfoil openings, and the intermediate portion causes each of the first leg portion and the second leg portion to press against walls of the pair of airfoil openings when a respective one of the plurality of retention clips is located in an installed position; and wherein the first leg portion defines a first leg axis extending through a first terminal end, the second leg portion defines a second leg axis extending through a second terminal end, the first leg axis being transverse to the second leg axis when the respective retention clip is in an installed position, and each of the first leg axis and the second leg axis is substantially parallel to the engine axis when the respective retention clip is located in the installed position.

10. The gas turbine engine as recited in claim 9, wherein the stator assembly is situated in a bypass flow path aft of the fan section.

11. The gas turbine engine as recited in claim 9, wherein the stator assembly is an inlet guide vane assembly forward of the compressor section.

12. The gas turbine engine as recited in claim 9, comprising a first retention member formed adjacent to each first end portion to trap the plurality of retention clips.

13. The gas turbine engine as recited in claim 9, wherein each second end portion receives a respective one of the plurality of retention clips to limit movement of the plurality of airfoils.

14. The gas turbine engine as recited in claim 9, wherein each retention clip of the plurality of retention clips includes a pair of generally U-shaped handles that each connect the intermediate portion to a respective one of the first and second leg portions.

15. A method of assembling a stator assembly for a gas turbine engine comprising:

providing a shroud defining a shroud opening;

moving an end portion of an airfoil into the shroud opening, the end portion defining a pair of airfoil openings;

compressing an intermediate portion of a retention clip that connects a pair of leg portions of the retention clip, including moving one of the pair of leg portions in a direction toward another one of the pair of leg portions in response to compressing the intermediate portion; and moving the pair of leg portions through the pair of airfoil openings such that the retention clip limits movement of the airfoil relative to the shroud;

wherein the step of moving the pair of leg portions includes simultaneously sliding the pair of leg portions a distance through the pair of airfoil openings; and wherein the retention clip includes a pair of generally U-shaped handles that each connect the intermediate portion to a respective one of the pair of leg portions.

16. The method as recited in claim 15, wherein the shroud defines a portion of a bypass flow path downstream of a fan.

17. The method as recited in claim 15, wherein the step of moving the pair of leg portions through the pair of airfoil openings includes decompressing the intermediate portion such that the pair of leg portions move outwardly relative to the intermediate portion to press against walls of respective ones of the pair of airfoil openings.

* * * * *